United States Patent [19]
Tsutsu

[11] Patent Number: 5,408,527
[45] Date of Patent: Apr. 18, 1995

[54] EXCHANGE SYSTEM AND METHOD OF CONNECTING CALLS IN SAID EXCHANGE SYSTEM

[75] Inventor: Yuichiro Tsutsu, Yokohama, Japan

[73] Assignee: Canon Kabushiki Kaisha, Tokyo, Japan

[21] Appl. No.: 150,350

[22] Filed: Nov. 10, 1993

Related U.S. Application Data

[63] Continuation of Ser. No. 69,403, May 5, 1993, abandoned, which is a continuation of Ser. No. 543,414, Jun. 26, 1990, abandoned.

[30] Foreign Application Priority Data

Jun. 28, 1989 [JP] Japan .................. 1-163853
Jun. 28, 1989 [JP] Japan .................. 1-163855

[51] Int. Cl.$^6$ ............................. H04M 3/54
[52] U.S. Cl. ......................... 379/211; 379/212; 370/110.1
[58] Field of Search ............ 379/242, 208, 210, 211, 379/212, 100, 98; 370/110.1

[56] References Cited

U.S. PATENT DOCUMENTS

| 4,958,153 | 9/1990 | Murata et al. | 379/208 |
| 5,033,079 | 7/1991 | Catron et al. | 379/211 |
| 5,050,005 | 9/1991 | Kagami | 379/100 |

FOREIGN PATENT DOCUMENTS

| 3644228 | 7/1988 | Germany | 379/211 |
| 136907 | 11/1978 | Japan | 379/211 |
| 217862 | 9/1988 | Japan | 370/210 |
| 85466 | 3/1989 | Japan | 379/211 |
| 1-149656 | 6/1989 | Japan | 379/211 |
| 1-289357 | 11/1989 | Japan | 379/211 |
| 3-101557 | 4/1991 | Japan | 379/211 |

Primary Examiner—James L. Dwyer
Assistant Examiner—Ahmand F. Matar
Attorney, Agent, or Firm—Fitzpatrick, Cella, Harper & Scinto

[57] ABSTRACT

Disclosed is an exchange system, to which a plurality of extension terminals are connected, for effecting a connection to any of the extension terminals upon receiving, from a network, incoming-call information which includes at least extension terminal designating information or attribute information. Also disclosed is a call connecting method in this exchange system. The plurality of extension terminal designating information and the extension terminal information are stored, in correlation, in a first memory, and representative extension information corresponding to the attribute information are stored in a second memory. Reference is made to the first memory to decide an extension terminal corresponding to the extension terminal designating information contained in the incoming-call information. When a decided extension is incapable of receiving an incoming call, a connection is made to a substitutable extension. When all of these substitutable extensions are incapable of received an incoming call, or when there is no extension designating information, an extension terminal having an attribute coinciding with the attribute information contained in the incoming-call information is decided and an incoming call is connected to the extension terminal decided.

26 Claims, 15 Drawing Sheets

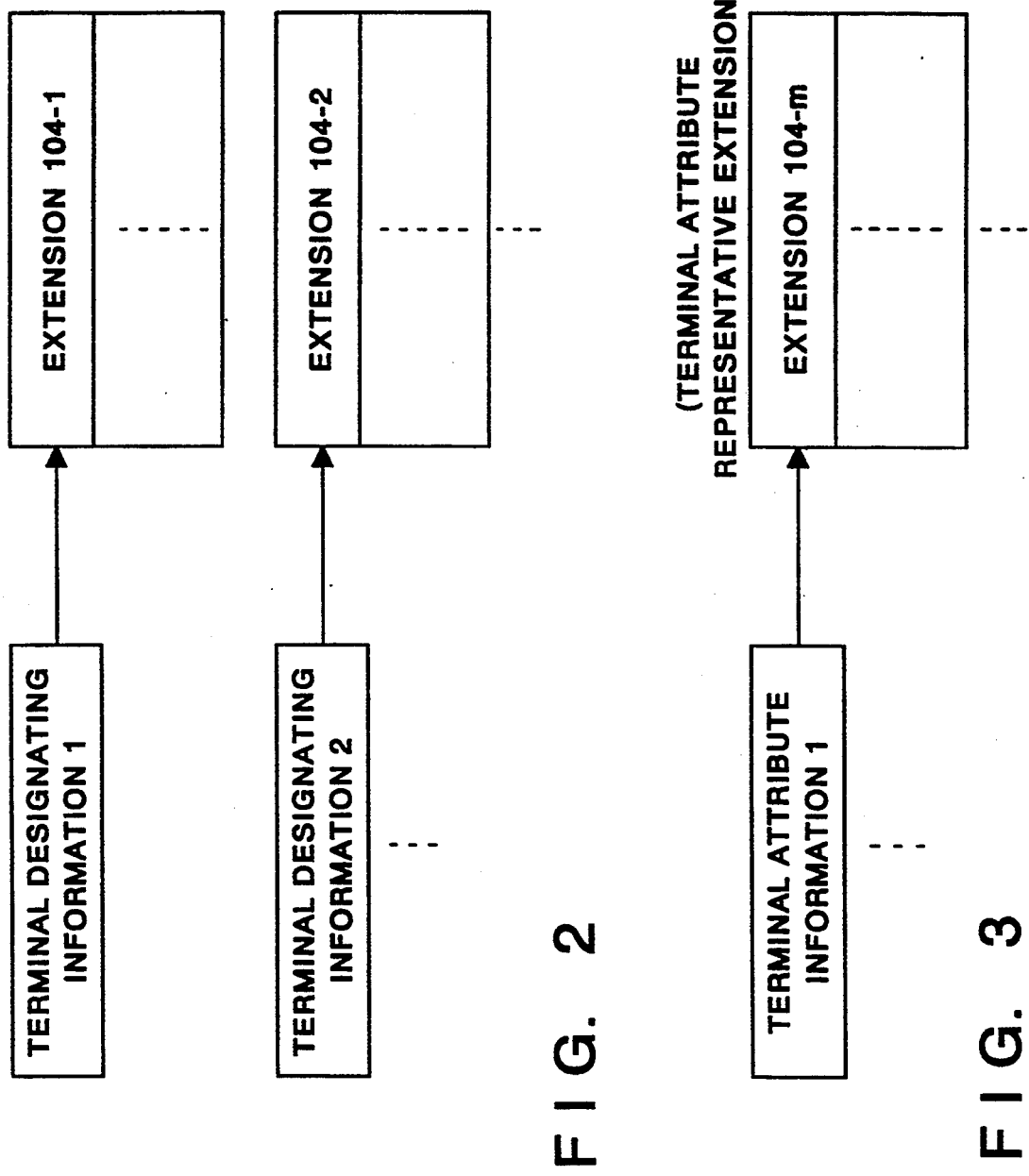

EXCHANGE SYSTEM AND METHOD OF CONNECTING CALLS IN SAID EXCHANGE SYSTEM

This application is a continuation of application Ser. No. 08/069,403, filed May 5, 1993, now abandoned which is a continuation of application Ser. No. 07/543,414, filed Jun. 26, 1990, abandoned.

BACKGROUND OF THE INVENTION

1. Field of the Invention

This invention relates to an exchange system for connecting a plurality of extension terminals and executing processing for connecting calls to the extension terminals in accordance with incoming-call information from an outside line. The invention relates also to a method of connecting calls in such an exchange system.

2. Prior Art

In an exchange known in the art, a call is placed to a specific extension terminal based on specific terminal designating information when such designating information arrives. The terminal designating information accompanies an incoming subaddress of direct inward dialing (DID) or an ISDN, by way of example. There are cases where terminal information designated by the terminal designating information of the incoming-call information is not registered in such an exchange. When such is the case, the following processing is executed:

(1) A message informing of an erroneous input is sent to the terminal on the calling side.

(2) The line is cut off without giving a response.

(3) A call is placed to a certain specific extension terminal that has been provided for a case such as this (this is performed by a exchange operator or the like).

Even if information relating to an extension terminal designated by terminal designating information has been registered, there are cases where the terminal is busy and cannot receive a call. This is dealt with by adopting the following method:

(4) The terminal on the calling side is informed of the fact that the called terminal is busy.

(5) As in example (3) mentioned above, a call is placed to a specific extension terminal based on fixed information that has been registered.

An exchange of this kind accommodates a modem pool (a plurality of extension terminals sharing a modem). In an exchange designed so as to be connected to such a modem pool, the following processing is executed based on incoming terminal designating information:

(6) A connection is made based on the fixed information that has been registered.

(7) The modem pool is designated by a specific number code, and an operator selects it one by one.

However, when a call is placed to a specific terminal as in (3), (5) and (6) in the above-described examples of the prior art, the terminal attributes on the calling side are not known. An unfortunate consequence is that in a case where the calling side is, e.g., a facsimile machine and the called terminal is, e.g., a telephone where an exchange operator is present, the calling side is billed for the call without normal communication place. Further, in examples (1), (2) and (4), the call is wasted. In example (7), where an operator must select one by one, a problem encountered is that the operator may make a designation error.

In recent years an exchange has been developed which accommodates a network, typified by an ISDN, that is capable of giving notification of communication attributes as incoming-call information, and can register attribute information of each of extension terminals as managing information. However, even an exchange of this type does not deal sufficiently with the foregoing problems. Specifically, when a connection has been made to a network capable of services having a variety of communication attributes despite the fact that the network is a single network, as in the case of an ISDN, there are cases where the designated terminal is not connected because the terminal designating information (a subaddress or the like) is erroneous, or where the designated terminal cannot be connected, as when it is busy, even though the terminal designating information is valid. In such cases, performing call processing (which, in the case of a group telephone line, entails connecting all lines to the exchange operator) by relying solely upon the terminal designating information or trunk attributes is inadequate and the advantages of an ISDN cannot be fully exploited.

Furthermore, when an extension terminal has been set to an automatic transfer, all incoming calls are automatically transferred to this terminal and, by way of example, it is impossible to arrange it so as to transfer only an incoming call from a communication terminal having a certain specific terminal attribute. Consequently, in the prior art described above, non-coincidence of attributes between terminals easily occurs after a connection is made. In communication with a network such as one capable of matching communication attributes between terminals before connection, as in the case of an ISDN, it is necessary to register and designate communication terminals and modem pools so as to make the connection based on communication attributes. In addition, in the aforementioned arrangement wherein communication terminals and modem pools are fixed and registered, there is inadequate flexibility. Moreover, designation errors are frequent when designation is performed one by one.

SUMMARY OF THE INVENTION

Accordingly, an object of the present invention is to provide an exchange system, as well as a call connection method in this exchange system, wherein an extension terminal to which a call is connected is decided by referring to extension terminal designating information and terminal attribute information, a representative extension terminal having this attribute information is stored in advance and, when a designated extension terminal is busy, the call is accepted by the representative extension terminal, thereby reducing situations in which an incoming call cannot be received.

According to the present invention, the foregoing object is attained by providing an exchange system, to which a plurality of extension terminals are connected, for connecting a network to any of the plurality of extension terminals upon accepting an incoming-call from the network, incoming-call information which includes at least extension terminal designating information or attribute information, comprising first memory means for storing a plurality of extension terminal designating information in correlation with respective ones of the plurality of extension terminals, second memory means for storing attribute representative extension terminals corresponding to the attribute information, extension deciding means which refers to the first memory means for deciding an extension terminal corresponding to the extension terminal designating information contained in the incoming-call information, and connecting means which refers to the first memory means to make a connection to another extension when an extension decided by the extension deciding means is busy.

According to another aspect of the invention, the foregoing object is attained by providing an exchange system, to which a plurality of extension terminals are connected, for effecting a connection to any of these extension terminals upon receiving, from a network, incoming-call information which includes at least extension terminal designating information or attribute information, comprising first memory means for storing the extension terminals as well as extension terminal designating information in correlation with the extension terminals, second memory means for storing attribute representative extension terminals corresponding to the attribute information, extension deciding means which refers to the second memory means for deciding an extension terminal having an attribute which coincides with the attribute information contained in the incoming-call information when an extension terminal corresponding to the extension terminal designating information contained in the incoming-call information has not been stored in the first memory means or when the incoming-call information does not contain the extension terminal designating information, and connecting means for connecting an incoming call to an extension terminal decided by the substitute extension deciding means.

Another object of the present invention is to provide an exchange system, as well as a call connection method in this exchange system, which makes it possible to provide an automatic transfer service that has become the object of communication.

Still another object of the present invention is to provide an exchange system, as well as a call connection method in this exchange system, in which when the attribute of a terminal corresponding to an incoming terminal-designating address does not coincide with incoming terminal attribute information, an incoming call can be received automatically by another terminal corresponding to this terminal attribute information.

According to the present invention, the foregoing objects are attained by providing an exchange system, to which a plurality of extension terminals are connected, for effecting a connection to any of these extension terminals upon receiving, from a network, incoming-call information which includes extension terminal designating information and attribute information, comprising memory means for storing transfer-destination information, in the form of attribute information, in correspondence with respective ones of the extension terminals, discriminating means for discriminating an extension terminal designated based on the extension terminal designating information of the incoming-call information, and control means for performing control in such a manner that when transfer-destination information of an extension terminal discriminated by the discriminating means has been stored in the memory means, a transfer is made to a transfer destination corresponding to the attribute information of the incoming-call information from among the transfer-destination information.

A further object of the present invention is to provide an exchange system, as well as a call connection method in this exchange system, wherein the method through which a modem pool is connected is furnished with flexibility to make it possible to minimize connection errors due to non-coincidence of attributes.

Yet another object of the present invention is to provide an exchange system in which it is possible to simplify connection designation and registration for connecting a modem pool.

According to the present invention, the foregoing objects are attained by providing an exchange system, to which a plurality of extension terminals are connected, for making a connection to any of these extension terminals upon receiving, from a network, incoming-call information which includes at least extension terminal designating information or attribute information, comprising memory means for storing transfer-destination information, along with attribute information, in correspondence with respective ones of the extension terminals, discriminating means for discriminating an extension terminal designated based on the extension terminal designating information contained in the incoming-call information, control means for performing control in such a manner that when transfer-destination information of an extension terminal discriminated by the discriminating means has been stored in the memory means, a transfer is made to a transfer destination having attribute information which coincides with the incoming-call attribute information from among the transfer-destination information, and connecting means which, when the transfer destination is a modem pool, is for connecting an incoming call to an extension terminal designated for the incoming call via the modem pool designated as the transfer destination.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram showing an example of data in which terminal designating information and extension terminals stored in a memory are correlated;

FIG. 3 is a diagram showing an example of data in which terminal attribute information and extension terminals representing terminal attributes stored in a memory are correlated;

DESCRIPTION OF THE PREFERRED EMBODIMENTS

Preferred embodiments of the present invention will now be described in detail with reference to the accompanying drawings.

[Description of Exchange System (FIGS. 1-3)]

Figure 1:
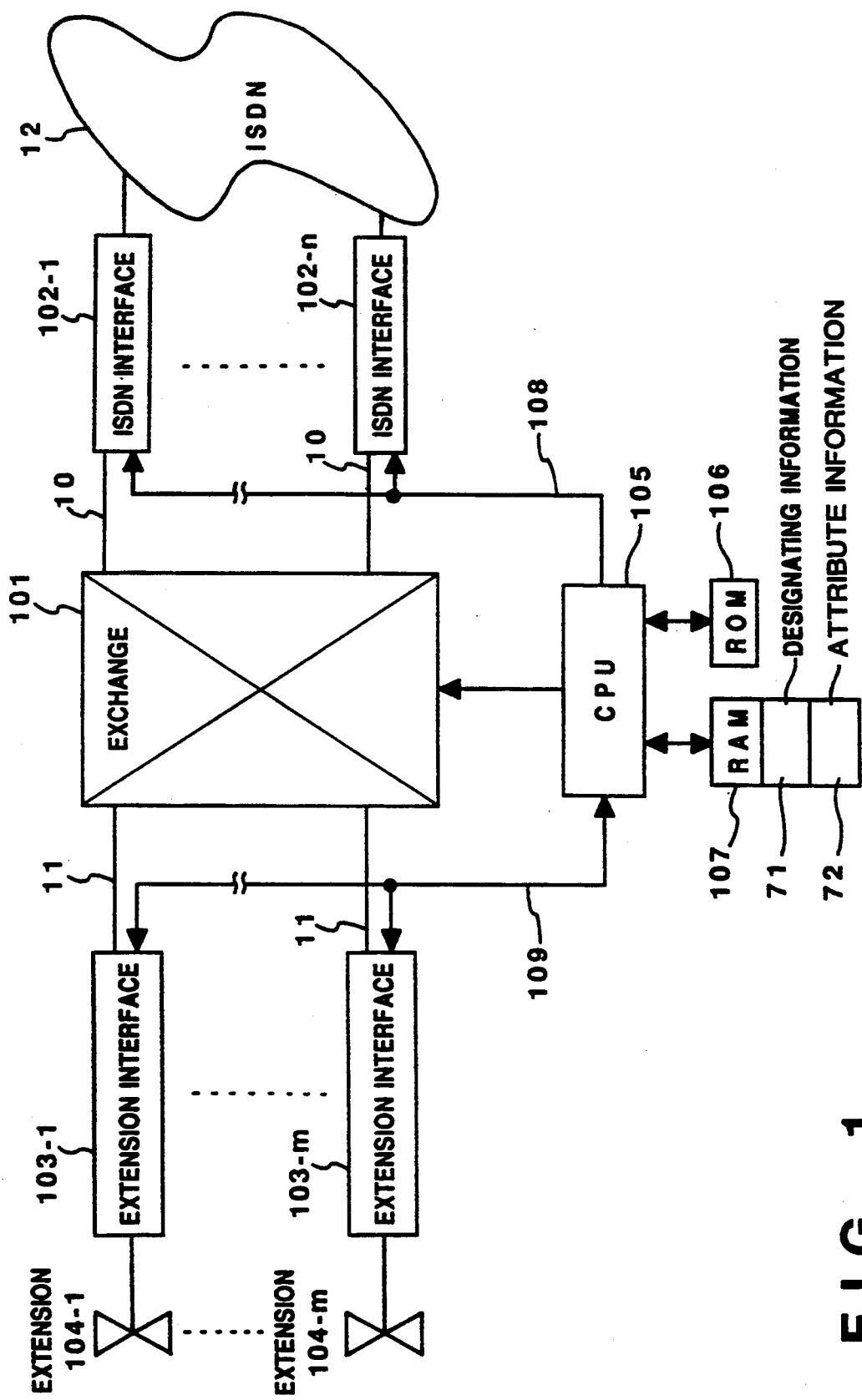
FIG. 1 is a block diagram showing a first embodiment of an exchange system according to the present invention.

FIG. 1 is a block diagram showing the first embodiment of an exchange system according to the present invention.

The system shown in FIG. 1 includes an exchange 101 for controlling the switching of channels on a time-shared basis, n-number of connected ISDN interfaces 102-1 through 102-n which accommodate an ISDN 12, m-number of extension interfaces 103-1 through 103-m which accommodate extension terminals 104-1 through 104-m and are connected to corresponding ones of these extension terminals, a controller (CPU) 105 for controlling the exchange 101, the interfaces and the like, a ROM 106 storing the control program of the CPU 105 as well as various data, and a RAM 107, which is used as the working area of the CPU 105, for temporarily preserving various data. The RAM 107 has memory 71 and 72. The memory 71 stores terminal designating information and extension terminal information corresponding to the terminal designation information. The extension terminal information includes substitute terminal designating information corresponding to the extension terminal. The memory 72 stores terminal attribute information and representative extension information corresponding to the terminal attribute information.

Numeral 108 denotes a control line for performing an exchange of control information between each of the ISDN interfaces 102-1 through 102-n and the CPU 105, and numeral 109 denotes a control line for performing an exchange of control information between the interfaces 103-1 through 102-m and the CPU 105. Numerals 10, 11 denote control lines for sending voice messages and data, which are to be communicated, between the exchange 101 and each of the interfaces. Numeral 12 denotes the ISDN.

FIG. 2 is a diagram showing the constitution of data in the memory 71 in which is registered the terminal designating information and extension terminal information corresponding to the terminal designating information. Here terminal designating information 1 corresponds to the extension 104-1, and terminal designating information 2 corresponds to the extension 104-2. Similarly, FIG. 3 is a diagram showing the constitution of data in the memory 72 in which are registered terminal attribute information and the representative extension terminal information corresponding to the terminal attribute information. This indicates that the terminal representative extension having the terminal attribute information 1 is extension 104-m.

[Description of CPU Operation (FIGS. 1 and 4)]

Figure 4A:
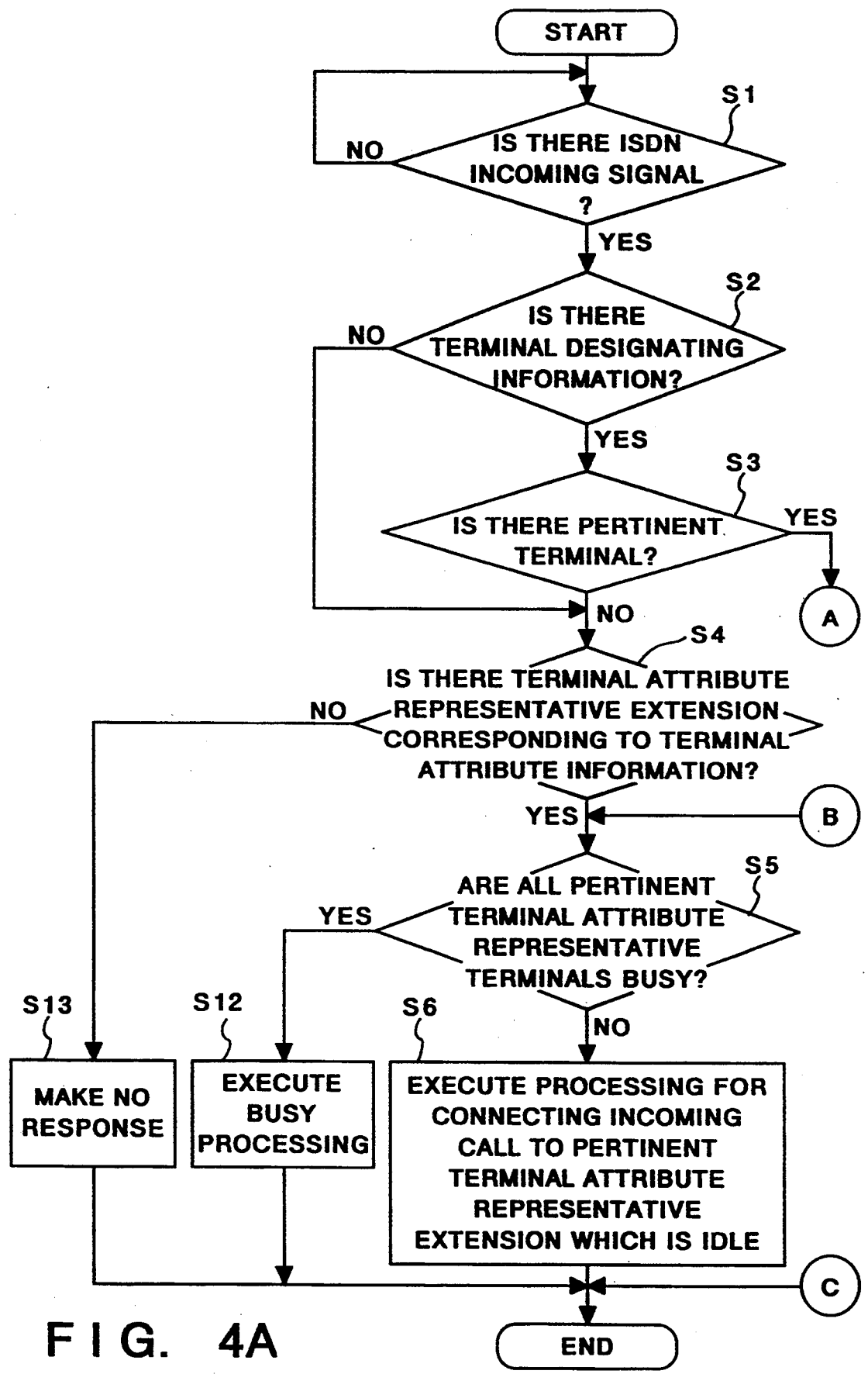
FIG. 4a–4b is a flowchart showing incoming-call processing in an exchange of the first embodiment.
Figure 4B:
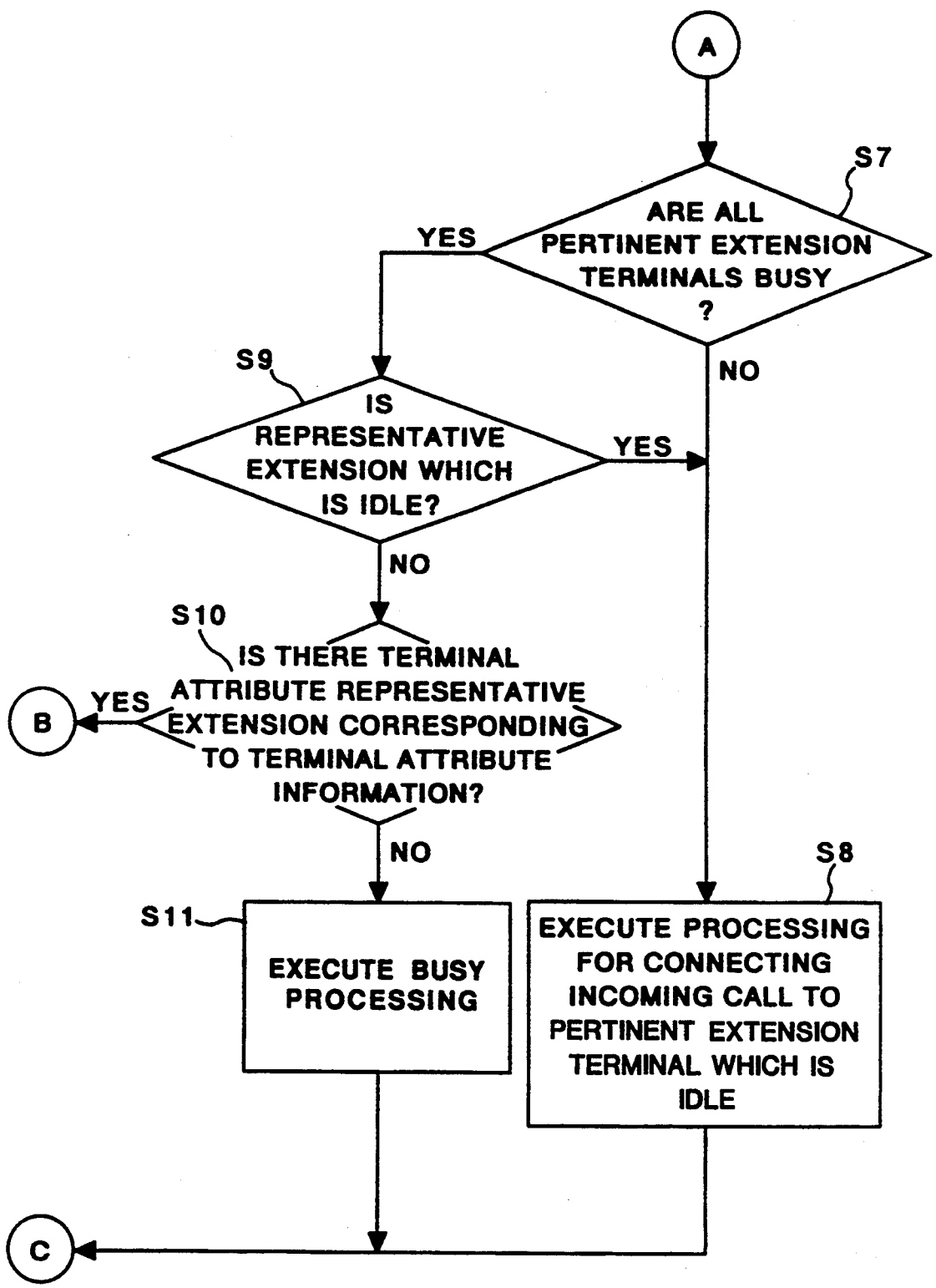

FIG. 4 is a flowchart illustrating the operation of the CPU 105 in the exchange system of the first embodiment. The control program for executing this processing is stored in the ROM 106.

When an incoming call from the ISDN 12 is detected at step S1 of the flowchart, the program proceeds to step S2, at which it is determined whether information notifying of the incoming call contains terminal designating information. When terminal designating information is contained, the program proceeds to step S3; otherwise, the program proceeds to step S4. The data in the memory 71 is referred to in order to determine whether an extension terminal pertaining to this designating information exists. If this is not registered in the memory 71 (i.e., if the pertinent extension terminal does not exist), the program proceeds to step S4. At step S4, the data in memory 72 is referred to in order to determine whether there is a terminal attribute representative extension corresponding to the terminal attribute information contained in the incoming call.

If the terminal attribute representative extension does not exist, the state of use of this terminal attribute representative extension is detected by the control line 109. If any one of these representative extension terminals is idle, the program proceeds to step S6. Here the corresponding extension interface is designated and processing is executed to connect the incoming call to this terminal attribute representative terminal.

When no terminal attribute representative extension is found to be idle at step S5, the program proceeds to step S12, at which a response is made by sending a busy signal to the calling side. If a terminal attribute representative line corresponding to the terminal attribute information is not found at step S4, the program proceeds to step S13. Here no response is made to the terminal on the calling side.

When a corresponding extension terminal is found to exist at step S3, the program proceeds to step S7. Here it is determined whether all corresponding extension terminals are busy. When there is an idle extension terminal, the program proceeds to step S8 and processing is executed for connecting the incoming call to this idle extension terminal.

When all extension terminals are found to be busy at step S7, the program proceeds to step S9, at which it is determined whether the incoming call is capable of being accepted by a substitutable extension terminal. If the call is capable of being accepted, the program proceeds to step S8. If the substitutable extension terminal is incapable of accepting the call, then the program proceeds to step S10, at which it is determined whether a terminal attribute representative extension exists. When such an extension exists, the program proceeds to step S5 and the above-described processing is executed. When a terminal attribute representative extension does not exist, the program proceeds to step S11, at which busy processing is executed, such as returning a busy signal to the terminal on the calling side.

In accordance with the first embodiment as described above, a terminal attribute representative extension is set and registered for every terminal attribute information, thereby making it possible to minimize errors in terminal designating information from the calling side as well as wasted calls which result when a designated terminal is in a busy state.

Furthermore, in a case where an extension number is correctly entered but the terminal designating information is erroneous or the designated terminal is busy even when the terminal designating information is correct, the exchange operator can receive the call and make an inquiry if the incoming call is a voice transmission, or the call can be accepted by a substitute device if the incoming call is a facsimile transmission. Further, the contents of an incoming call accepted by a substitute device can be transmitted automatically as soon as the terminal becomes idle. Thus, various services can be offered.

[Description of Second Embodiment (FIGS. 5-8)]

Figure 5:
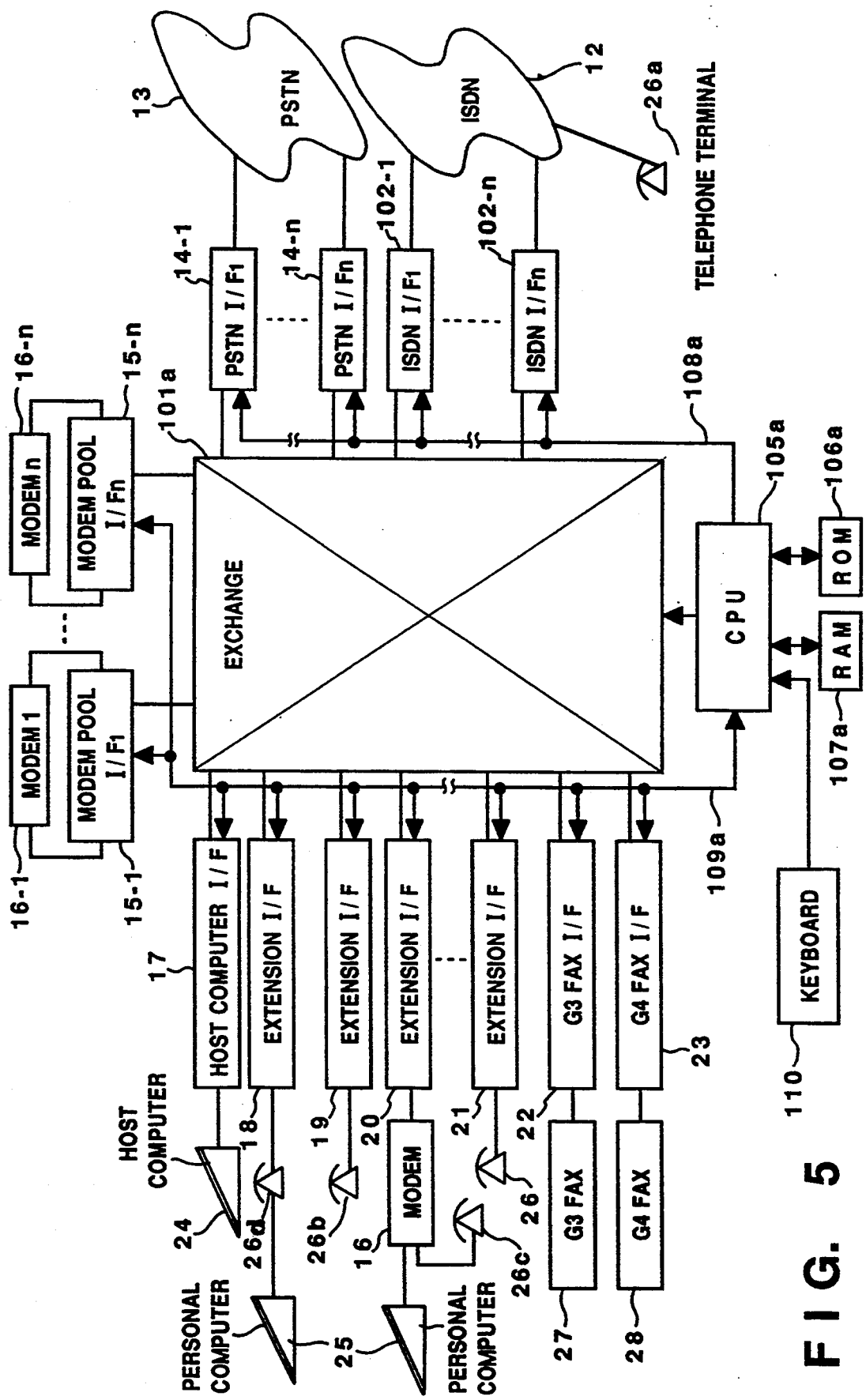
FIG. 5 is a block diagram showing a second embodiment of an exchange system according to the present invention.

FIG. 5 is a block diagram showing a second embodiment of an exchange system according to the present invention. Portions similar to those shown in FIG. 1 are designated by like reference characters.

Figure 6:
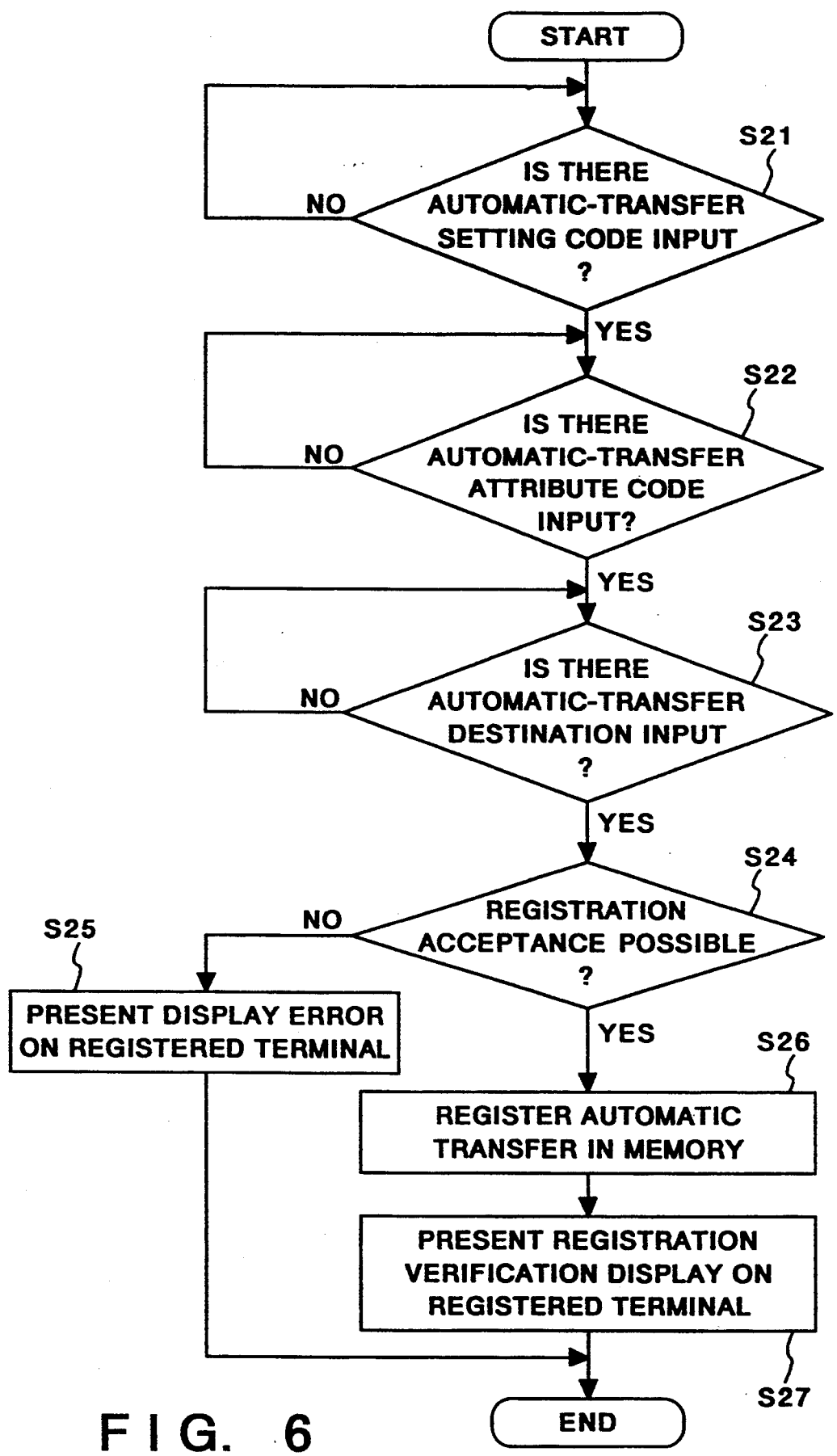
FIG. 6 is a flowchart showing processing for registering transfer destination.
Figure 7A:
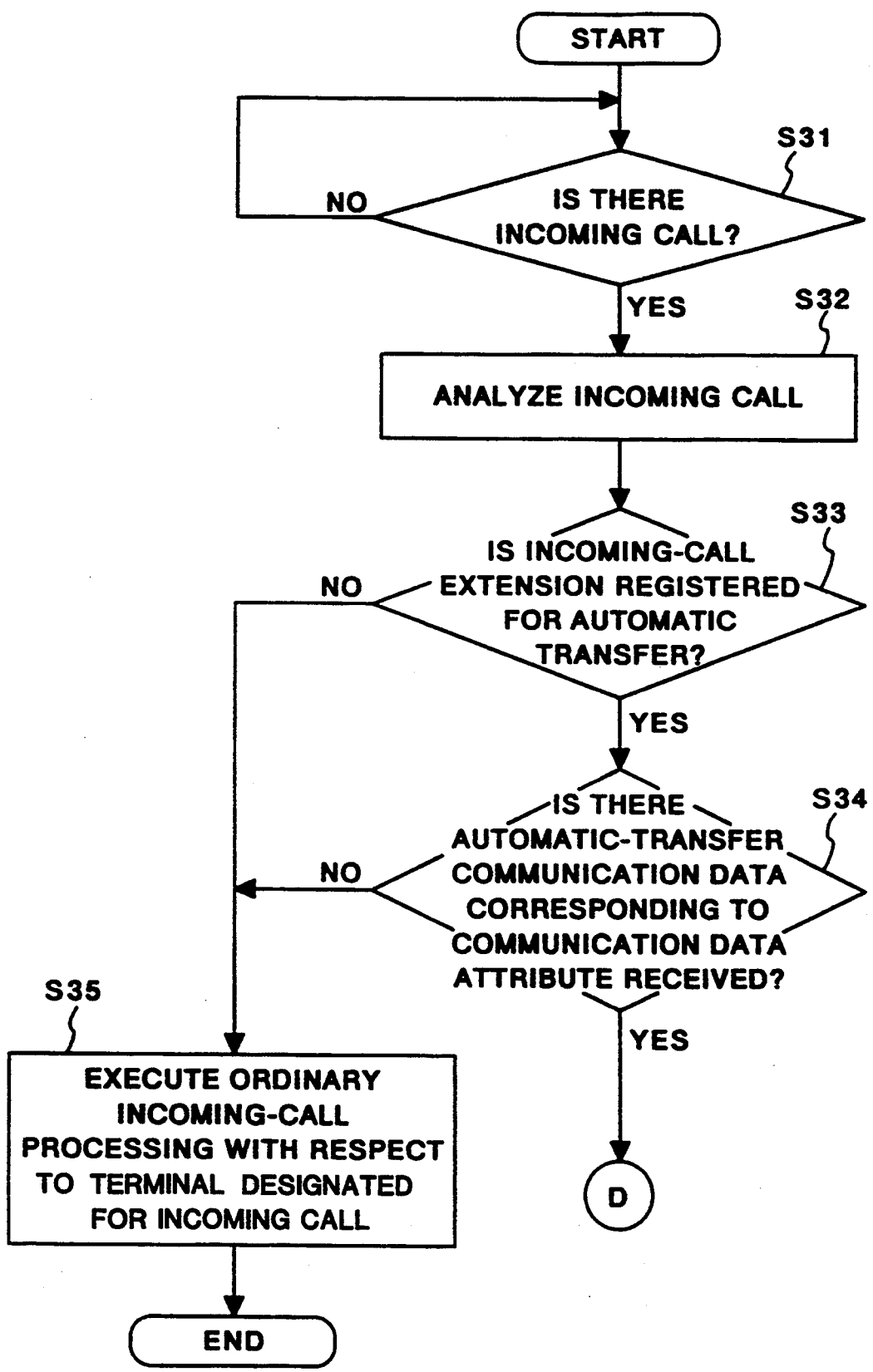
FIG. 7a–7c is a flowchart showing incoming-call processing in an exchange of the second embodiment.
Figure 7B:
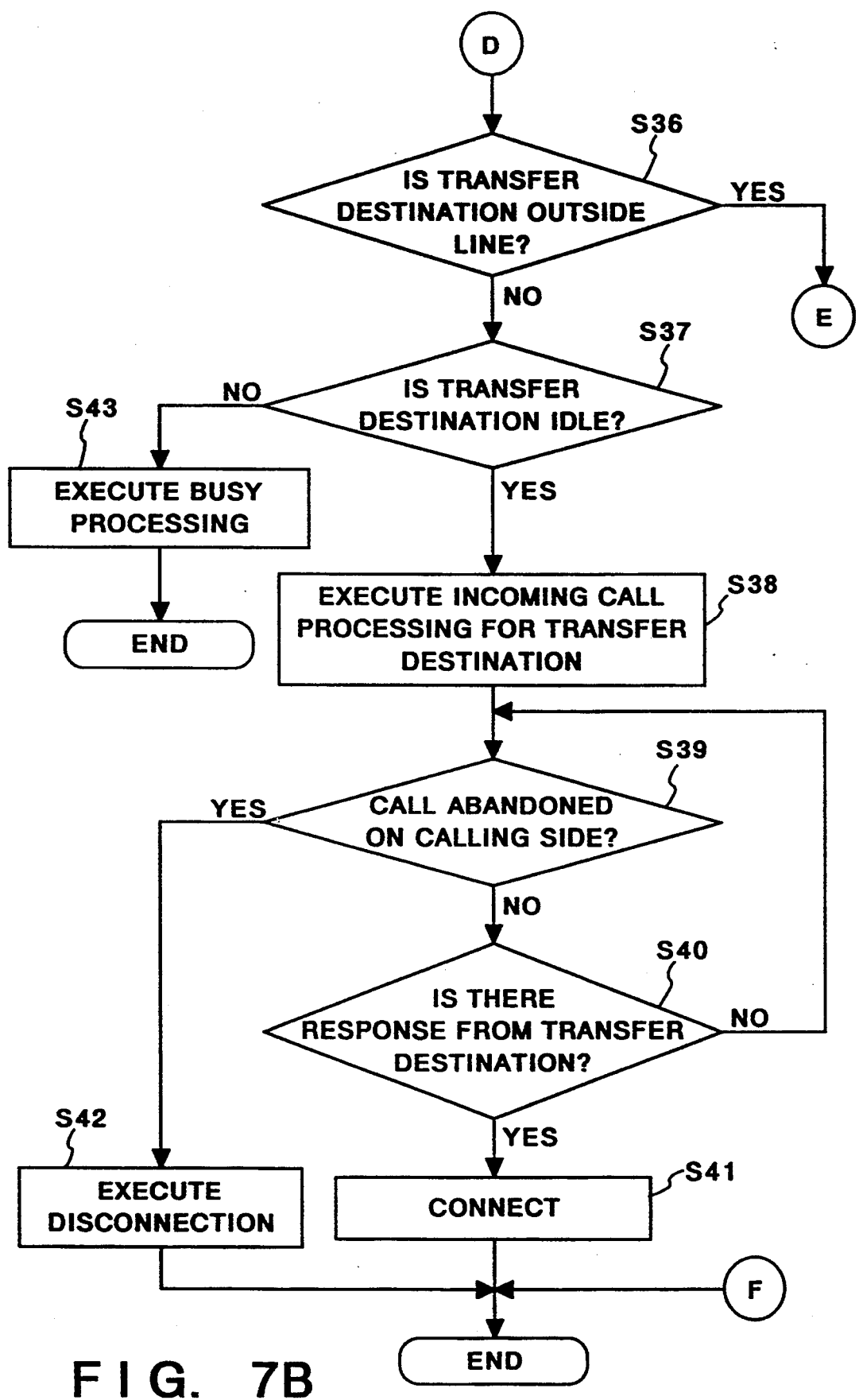
Figure 7C:
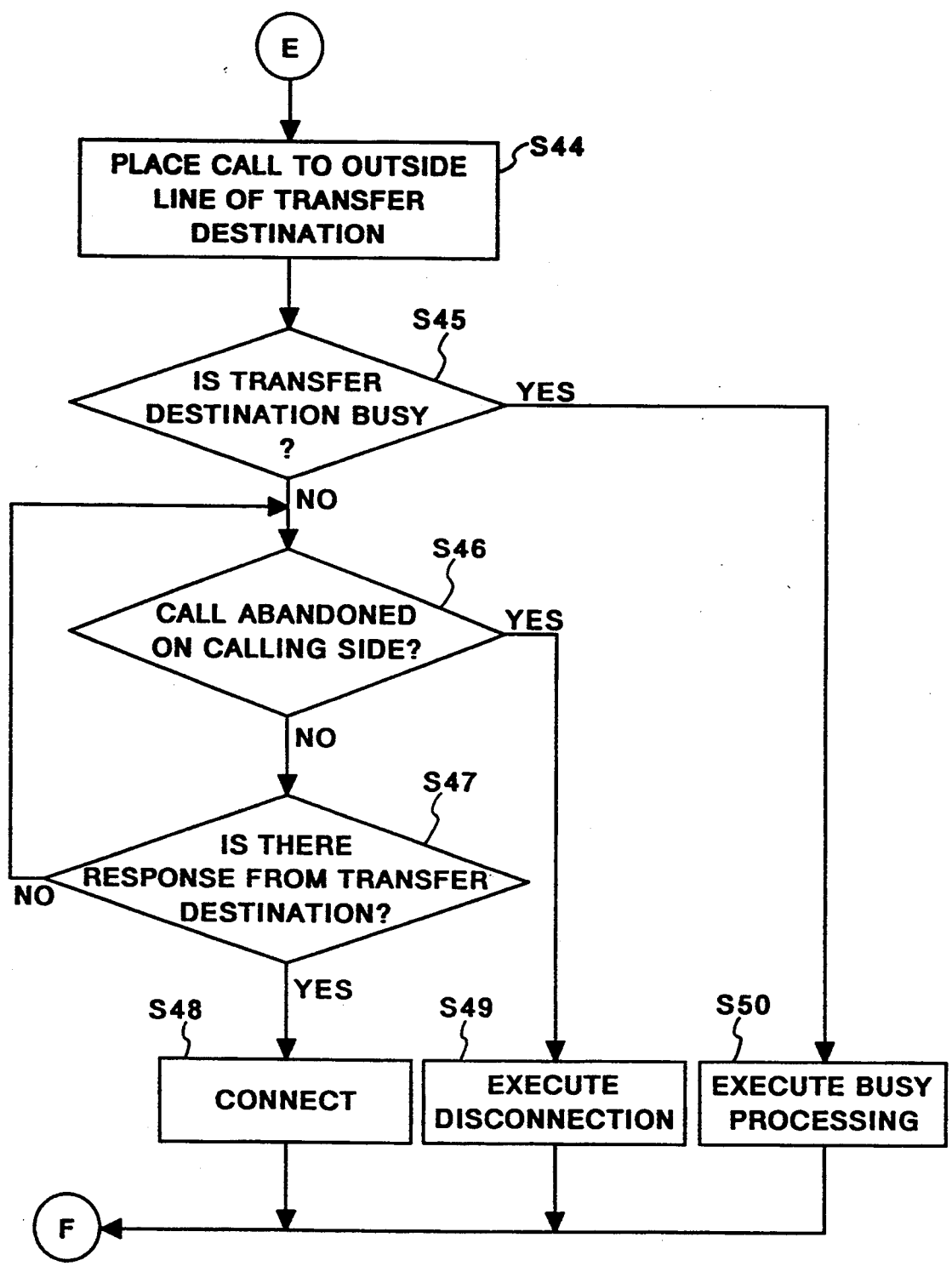

The system shown in FIG. 5 includes an exchange 101a for switching a call by means of time sharing switches, ISDN interfaces 102-1 through 102-n a controller (CPU) 105a, a ROM 106a storing a control program, etc., illustrated by the flowcharts shown in FIGS. 6 and 7, a RAM 107a for storing various set information, a keyboard 110 for entering automatic transfer setting codes, automatic transfer destinations and transfer attribute codes as shown in the flowchart of FIG. 6, and interfaces 14-1 through 14-n which accommodate an analog pay station network (PSTN) 13. A communication information data channel is connected to the exchange 101a through these ISDN interfaces 102-1 through 102-n and PSTN interfaces 14-1 through 14-n. The control data is communicated to the CPU 105a through a control line 108a.

The system further includes extension interfaces 17 through 23 provided to correspond to extension terminals 24 through 28, a host computer 24, and leased telephones 26, 26b. The leased telephone 26d incorporates a data adapter through which the telephone is connected to a personal computer 25. Numeral 16 denotes a modem, and 26c a telephone connected to the modem 16. Numeral 27 designates a G3 FAX connected to the interface 22, and 28 a G4 FAX connected to the interface 23. The modem 16 is connected to a modem pool interface 15. Numeral 26a denotes a telephone terminal accommodated in the ISDN 12.

Figure 8:
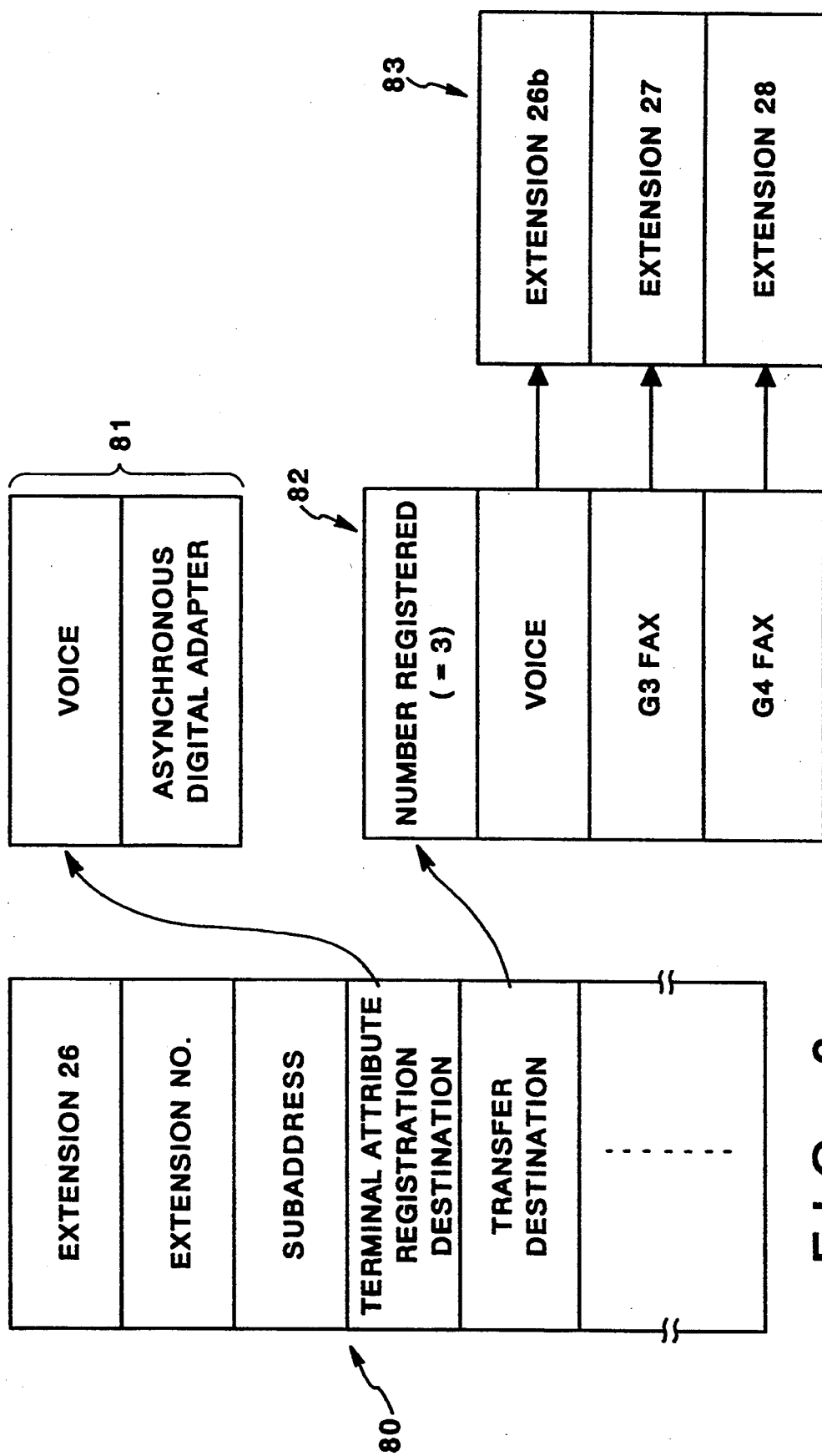
FIG. 8 is a diagram showing an example of transfer-destination registration processing.

FIG. 8 is a diagram showing the constitution of data in an extension terminal setting memory. These data are stored in the RAM 107a. Numeral 80 denotes the constitution of data in an extension terminal management memory. The data comprise office location, extension number, ISDN subaddress, destination of terminal attribute registration, transfer destination and other information (tenant, etc.). Numeral 81 represents an attribute memory of an extension terminal designated by the destination of the terminal attribute registration of the management memory. Numeral 82 indicates the registered number (=3) of transfer destinations designated by the management memory, as well as the attribute information of each transfer destination. This transfer destination (a numerical value corresponding to the terminal number of FIG. 5) is registered at 83.

In the example shown in FIG. 8, a terminal attribute has the two attributes of a voice and an asynchronous data communication digital adapter, as shown at 81. This corresponds to the extension terminal (telephone 26d) of FIG. 5. The telephone 26d is connected to the personal computer 25 through an internal RS-232C interface. Three extension terminals are registered as automatic transfer destinations of the telephone 26d. One is the telephone 26b as an absence transfer registration of the voice, as shown at 82. Further, the extension G3 FAX 27 and G4 FAX 28 are registered as transfer destinations.

The control processing in this embodiment will be described in accordance with FIGS. 6 and 7.

FIG. 6 is a flowchart illustrating registration processing for registering automatic transfer destinations of the kind shown in FIG. 8 upon an input of transfer-destination data to the CPU 105a from the keyboard 110 or an extension terminal.

When entry of a set code of an automatic transfer destination is detected at step S21, the program proceeds to step S22, at which it is determined whether there is an input of an automatic transfer attribute code. When the attribute code is entered, the program proceeds to step S23, at which the system waits for entry of the address of an automatic transfer destination. Next, the program proceeds to step S24, at which an analysis is made, based on the address and attribute of the transfer destination, to determine whether it is possible to make a transfer to the transfer destination entered at steps S22, S23. For example, if a voice code is entered as the transfer-attribute code and this transfer destination is a synchronous 9600 bps host computer, it is judged that the transfer is impossible and the program proceeds to step S25. At the time of an input from an input terminal or the keyboard 110, an error display is performed by the controller 105a and processing is terminated.

If it is judged at step S24 that reception of registration is possible, then the program proceeds to step S26, at which each transfer attribute and transfer destination are registered in the memory (RAM 107a), as shown in FIG. 8. Next, the program proceeds to step S27, at which a registration verification display is made on the input terminal and processing is terminated.

Automatic transfer processing by the exchange 101a will now be described in accordance with the flowchart of FIG. 7.

When an incoming call is detected at step S31, the program proceeds to step S32, at which the incoming call is analyzed. The analysis involves determining which network is that of the incoming call, what the incoming call attribute is and which is the incoming-call terminal. Next, the program proceeds to step S33, at which it is determined whether an automatic transfer destination corresponding to the extension which has received the incoming-call information designation has been registered. If the number of registered transfer destinations is more than one, as shown in FIG. 8, then it is determined at step S34 whether attribute information corresponding to the incoming communication attribute has been registered in the RAM 107a. When it is found at step S33 or S34 that the transfer destination has not been registered in the extension which has accepted the incoming call, or that an extension terminal having an automatic transfer communication data attribute corresponding to the incoming communication attribute has not been registered, the program proceeds to step S35. Here a transition is made to an incoming-call processing sequence for the terminal which has received the communication designation.

When it is found at step S34 that an attribute corresponding to the incoming-call communication attribute has been registered, the program proceeds to step S36, where it is determined whether this transfer destination is an outside line. If it is not an outside line, the program proceeds to step S37, where the status of the transfer destination is investigated. If the transfer destination is idle, incoming-call processing for connecting the incoming call to the transfer destination is executed at step S38. When the transfer destination responds at step S40 before the calling side abandons the call at step S39, connection processing is performed at step S41 and the transfer is ended.

If the calling side abandons the call at step S39 before the transfer destination responds, the program proceeds to step S42, at which disconnection processing is executed to cancel the transfer in-progress state and effect a transition to the idle state. In a case where the transfer destination is busy at step S37, the program proceeds to step S43 and busy processing is executed.

If it is found at step S36 that a transfer destination has been registered as an outside line, the program proceeds to step S44 and call processing is carried out with regard to the outside line of the transfer destination. If the transfer destination is found not to be busy at step S45, the program proceeds to step S46, where the system waits for a response from the transfer destination. If the transfer destination responds at step S47 before the calling side abandons the call, connection processing is carried out at step S48.

When the calling side abandons the call at step S46 before the transfer destination responds, the program proceeds to step S49, at which disconnection processing is performed just as at step S42.

Further, if the transfer destination is found to be busy at step S45, the program proceeds to step S50, at which the outside line is disconnected and busy processing similar to that of step S43 is executed.

In accordance with the embodiment described above, automatic transfer is performed for every communication data attribute. As a result, from among terminals having a plurality of communication data attributes, a transfer can be made automatically to terminals having the functions of these terminals.

In addition, by designating the address of one extension terminal for which a plurality of transfer destinations have been set, a connection can be made to a terminal having a communication data attribute matching the attribute of the terminal on the calling side. More specifically, when a G3 FAX is registered as a transfer attribute and the G3 FAX is registered as this transfer destination, the incoming call can be connected to the FAX at the same terminal address even if the registered terminal does not possess a FAX function, by way of example. That is, regardless of the communication attribute of the communication terminal on the transmitting side, communication is possible merely by placing a call to the address of a specific extension terminal.

Though the second embodiment has been described based on an exchange, the invention generally is applicable also to a terminal capable of being directly connected to a network. For example, in a communication terminal having a plurality of function attributes, such as a telephone function, personal computer function, a data communication function related thereto or a FAX function, it is possible to perform an automatic transfer for every respective communication function attribute.

[Description of Third Embodiment (FIGS. 9–11)]

Figure 9:
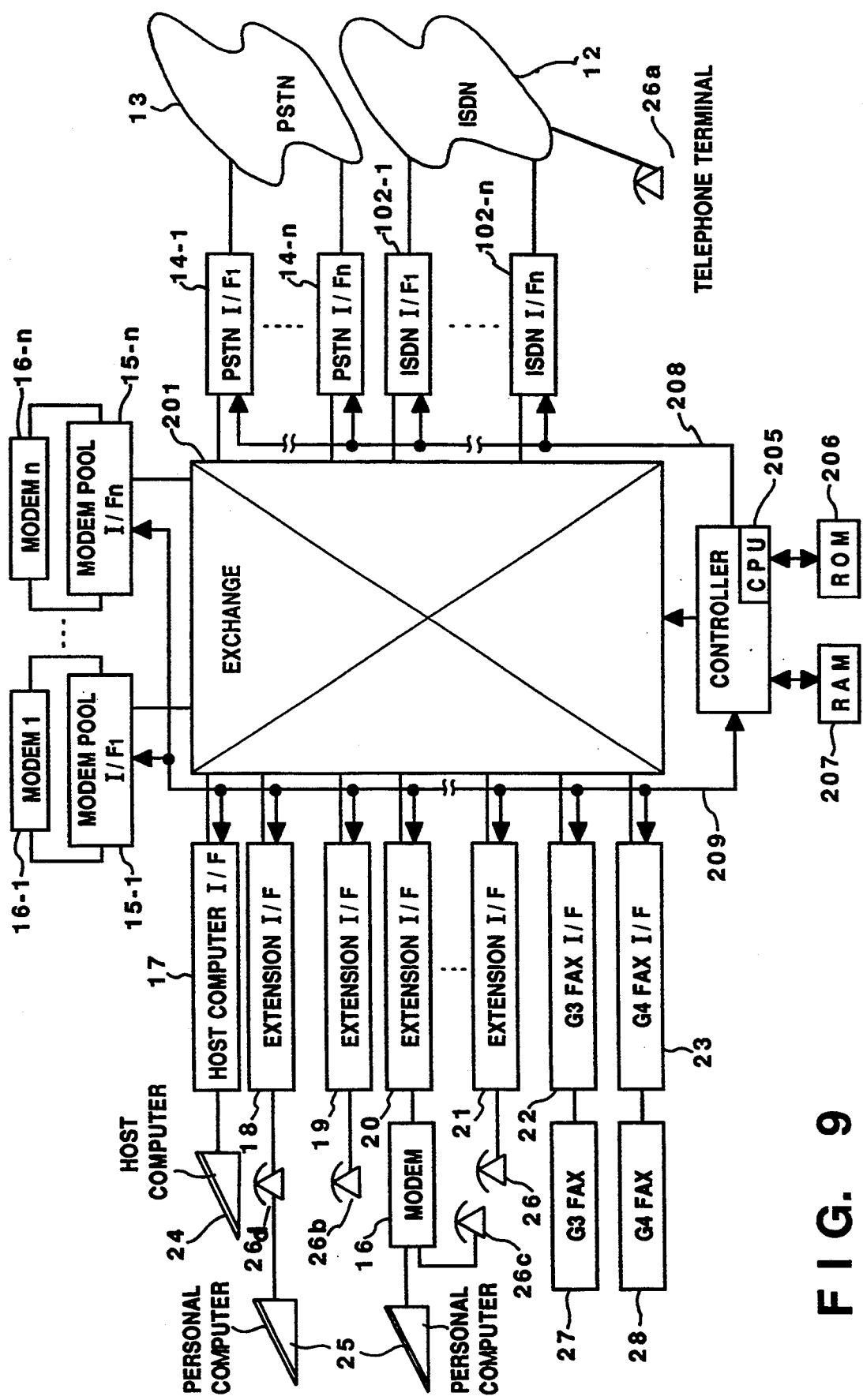
FIG. 9 is a block diagram of an exchange system illustrating a third embodiment of the present invention.

FIG. 9 is a block diagram showing a third embodiment of an exchange system according to the present invention. Portions similar to those shown in FIG. 5 are designated by like reference characters.

The system shown in FIG. 9 includes an exchange 201 for controlling the switching of channels on a time-shared basis, and a controller 205 for performing control in accordance with a control program and various data stored in a ROM 206. The controller 205 is equipped with a CPU such as a microprocessor and executes control of various interfaces as well as call processing. Also included is a RAM 207 used as the working area of the CPU of controller 205 for temporarily preserving various data. Communication information data channels passing through the interfaces of the PSTN 13 and ISDN 12 are connected to the exchange 201. These channels are switched by the exchange 201 and connected to the extension terminals. These interfaces (14-1 through 14-n, 102-1 through 102-n) and the controller 205 are connected by a control data channel 208. Modem pool interfaces are shown at 15-1 through 15-n and respectively connect a modem 1 (16-1), a modem 2 (16-2), ... modem n (16-n). These interfaces 15 and 17 through 23 are further connected to the controller 205 via a control data channel 209, just as the interfaces 14, 102.

[Description of Processing for Registering Transfer Destination (FIG. 10)]

Figure 10:
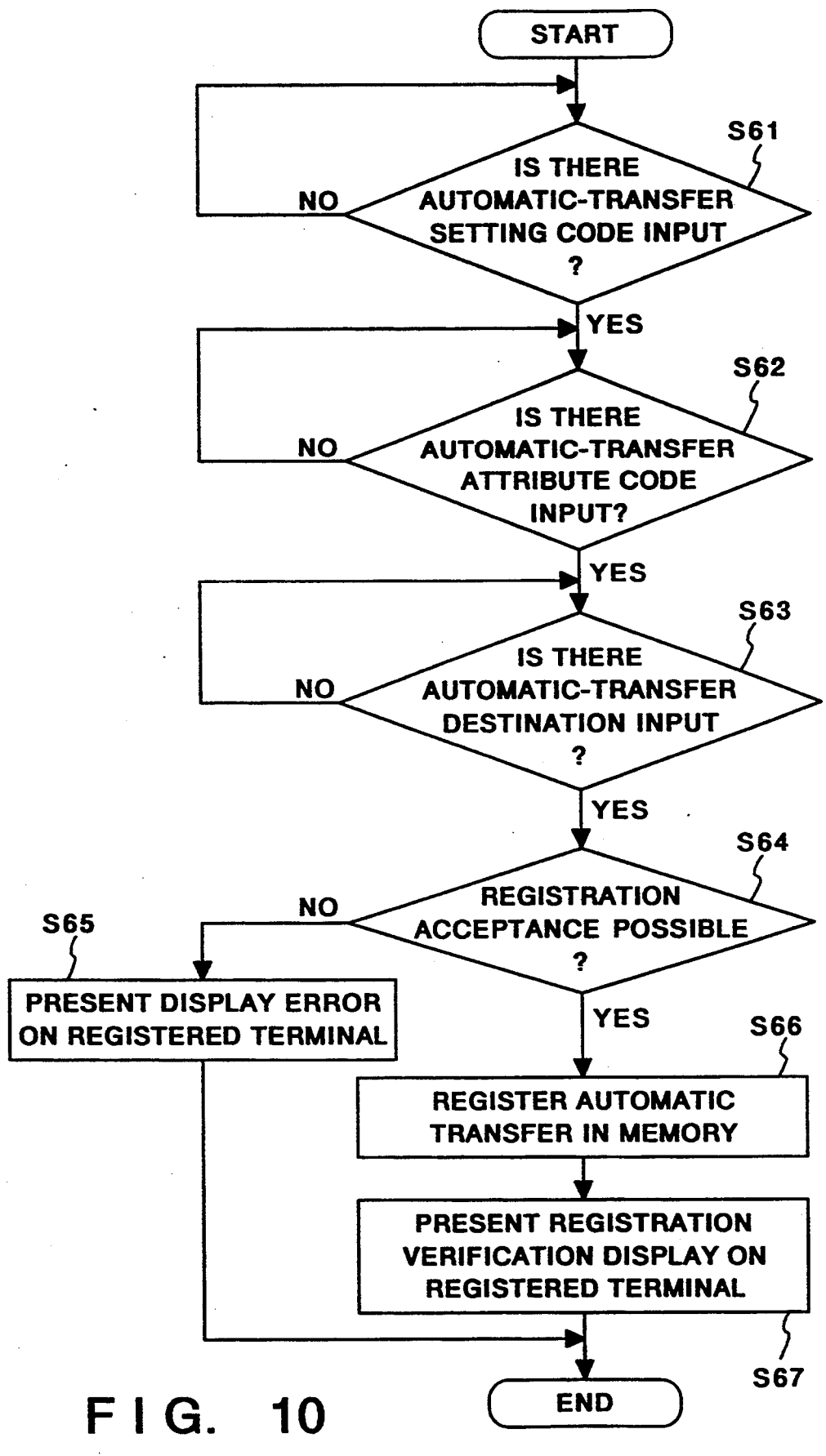
FIG. 10 is a flowchart showing processing for registering automatic transfer destination.

FIG. 10 is a flowchart illustrating processing for registering an automatic-transfer destination when transfer-destination data are sent from an extension terminal to the controller 205. The program for executing this processing has been stored in the ROM 206.

When it is detected at step S61 of the flowchart that a set code of an automatic-transfer destination has been entered, the program proceeds to step S62, at which it is determined whether an automatic-transfer attribute code has been entered. When the code is entered, the program proceeds to step S36, at which the system waits for a transfer-destination address, etc. Next, the program proceeds to step S64, at which analysis is performed to determine whether the transfer destination and its attribute are capable of being transferred. If transfer is impossible (e.g., if a voice code is entered as the transfer attribute and the transfer destination is a synchronous 9600 bps host computer), then the program proceeds to step S65. Here an error display is presented on this input terminal and processing is ended.

If it is decided at step S64 that acceptance of registration is possible, then the program proceeds to step S66, at which the arrangement shown in FIG. 11, described below, is adopted and each transfer attribute and transfer destination are registered in memory (RAM 207). Next, the program proceeds to step S67, at which a registration verification display is presented on the input terminal and registration processing is ended.

[Description of Transfer-Destination Registration Information (FIG. 11)]

Figure 11:
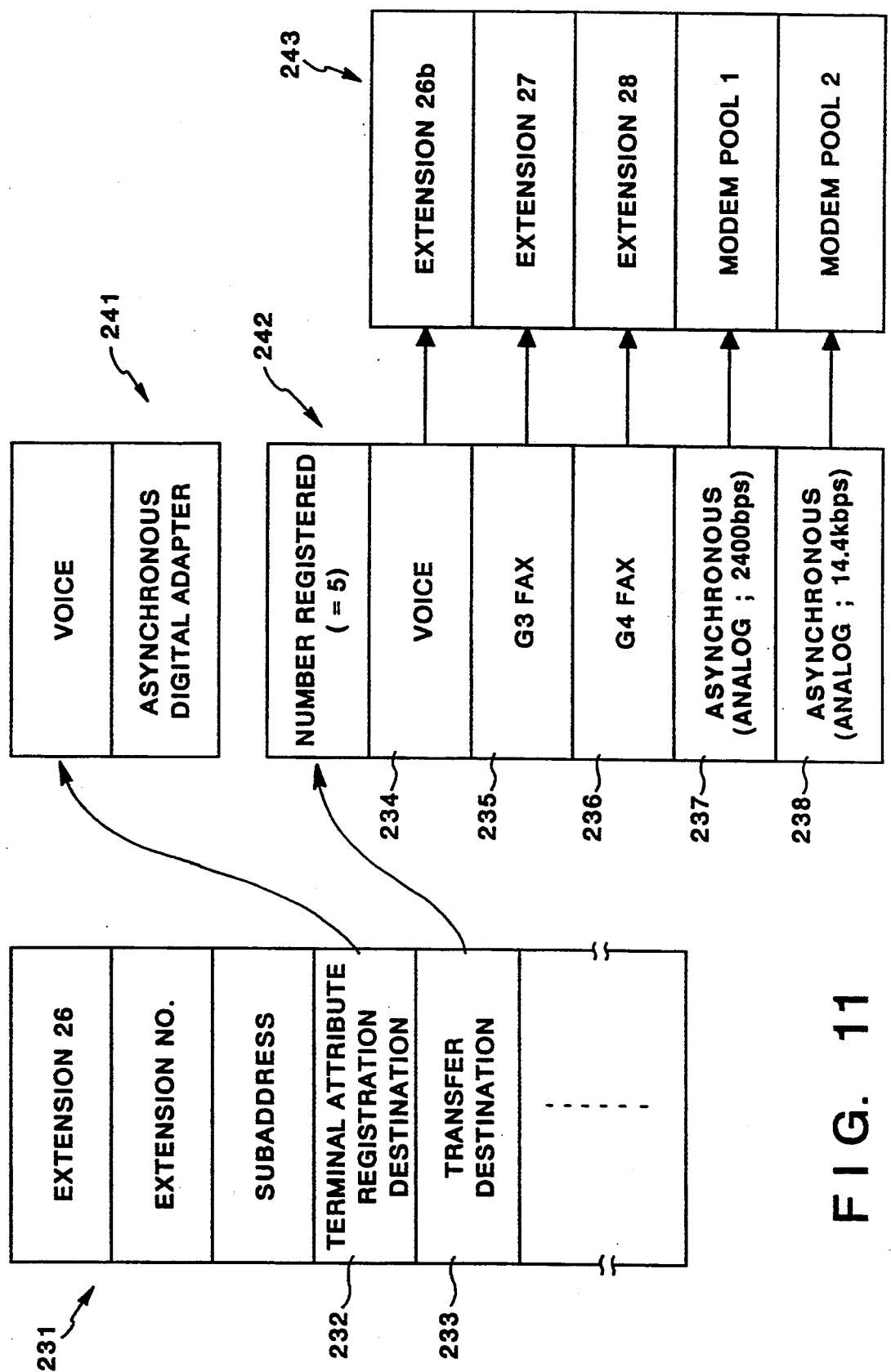
FIG. 11 is a diagram showing an example of data in which terminal attribute information and extension terminals representing terminal attributes stored in a memory are correlated.

FIG. 11 is a diagram showing the constitution of data in an extension terminal setting memory. These data are stored in the RAM 107.

Numeral 231 denotes the constitution of data in an extension terminal management memory. The data comprise the office location of the telephone 26 incorporating a data adapter, the extension number, ISDN subaddress, a destination 232 of terminal attribute registration, a transfer-registration destination 233 and other information (tenant, etc.). Numeral 241 denotes an example of attribute information of an extension terminal designated by the terminal attribute registration destination 232 in the management memory. Accordingly, it will be understood that the telephone 26 performs voice communication and is equipped with an asynchronous digital adapter. Numeral 242 illustrates an example of data of the transfer registration destination 233. The registered number (=5 in this example) of transfer destinations, the attribute information of the transfer destinations, and the extension number corresponding to each item of attribute information are stored.

In accordance with this arrangement, the five transfer destinations registered at transfer destinations of the telephone 26 are a leased telephone 26b as an absence transfer registration of the voice, a G3 facsimile machine of extension 27 for a G3 facsimile signal, and a G4 facsimile machine 28 for a G4 facsimile signal. Also, an asynchronous, analog (e.g., a 3.1 KHz attribute of the ISDN) data communication of 2400 bps is connected via a modem pool 1 (15-1). An asynchronous analog 14.4 Kbps is set so as to be connected via a modem pool 2 (15-2).

[Description of Automatic-Transfer Processing (FIG. 12)]

Figure 12A:
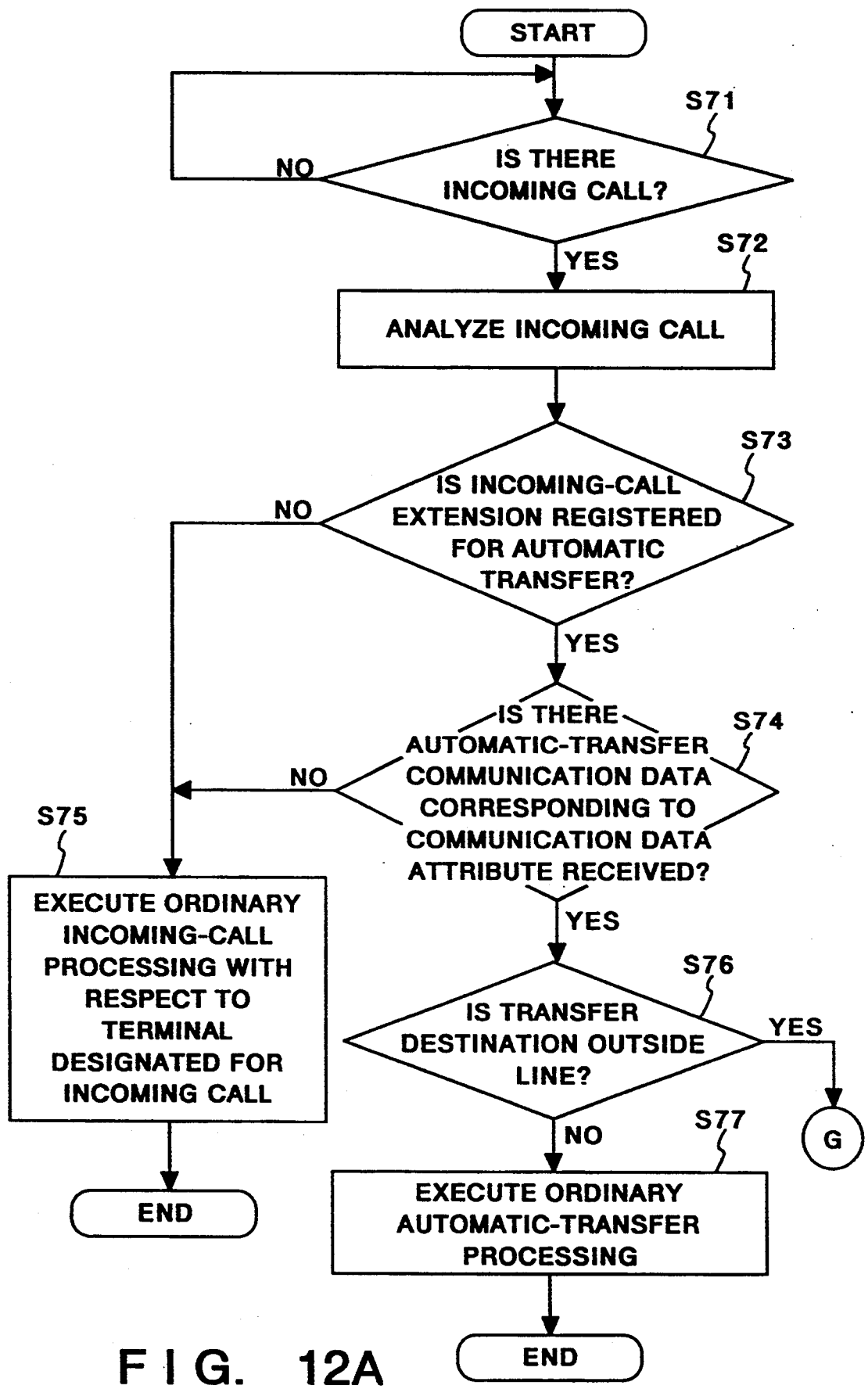
FIG. 12a-12b is a flowchart showing incoming-call processing in an exchange of the third embodiment.
Figure 12B:
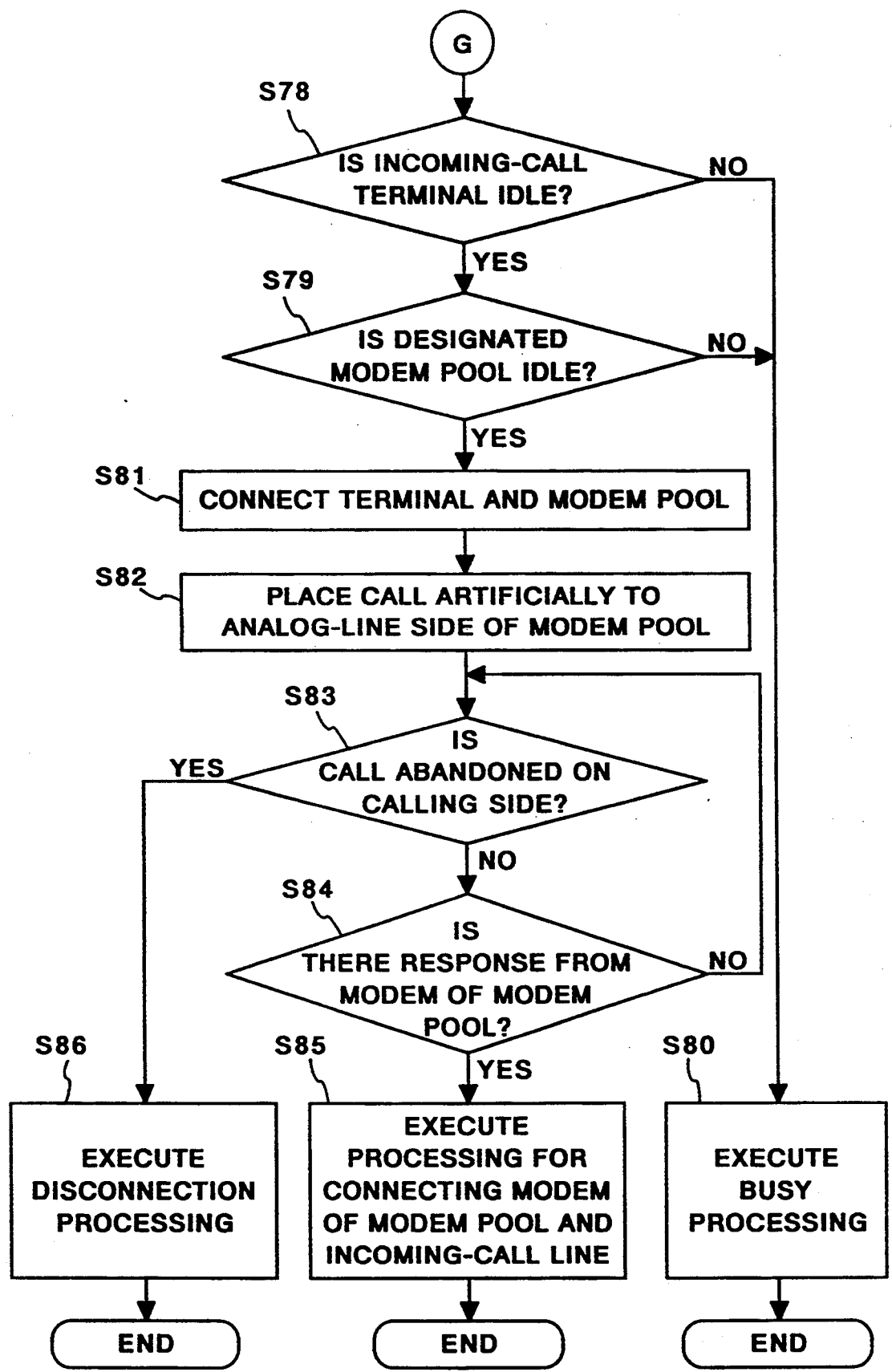

Automatic transfer processing by the exchange 201 will now be described in accordance with the flowchart of FIG. 12. The control program which instructs execution of this processing has been stored in the ROM 206.

When an incoming call is detected at step S71, the program proceeds to step S72, at which the incoming call is analyzed. The analysis involves determining which network is that of the incoming call, what the incoming call attribute is and which is the incoming-call terminal. Next, the program proceeds to step S73, at which it is determined, by referring to the transfer destination information stored in the RAM 207 shown in FIG. 11, whether an automatic transfer destination corresponding to the extension which has received the incoming-call information designation has been registered. If the number of registered transfer destinations is more than one, as shown in FIG. 11, then it is determined at step S74 whether attribute information corresponding to the incoming communication attribute has been registered in the RAM 207. When it is found at step S73 or S74 that the transfer destination has not been registered in the extension which has received the incoming call, or that an extension terminal having an automatic transfer communication data attribute corresponding to the incoming communication attribute has not been registered, the program proceeds to step S75. Here a transition is made to an incoming-call processing sequence for the terminal which has received the communication designation.

When it is found at step S74 that an attribute corresponding to the incoming-call communication attribute has been registered, the program proceeds to step S76, where it is determined whether this transfer destination is a modem pool. If it is not a modem pool, the program proceeds to step S77, where processing is executed in such a manner that an automatic transfer is made to the usually registered transfer destination.

If the transfer destination is found to be a modem pool at step S76, the program proceeds to step S78, at which it is determined whether the terminal designated for the incoming call is idle (this is an idle check as a digital data adapter attribute). If the terminal is idle, the program proceeds to step S79, at which it is determined whether the modem pool of the transfer destination is idle. If it is not idle, busy processing is executed at step S80.

If the modem pool of the transfer destination is found to be idle at step S79, the program proceeds to step S81, at which processing is executed to connect the destination terminal and the modem pool. Next, at step S82, the interface, namely the modem, on the analog side of the modem pool artificially makes a call from the two-line modular side ordinary connected to the public telephone system. Specifically, in conformity with the technical requisites of NTT, 400 Hz is modulated at 16 Hz as a signal transmission format of a transmission voltage of 75V from the analog interface side of the corresponding modem pool, this signal is rendered intermittent at an impulse ratio of 20 IPM and a make rate of 33%, and the signal is transmitted to the analog input side of the connected modem.

Thus, when a modem of the modem pool responds at step S84 before the calling side abandons the call at step S83, the program proceeds to step S85, at which a response is made to the incoming-call line and the modem of the modem pool is connected to the incoming-call line. If the calling side abandons the call before the modem of the modem pool responds, processing is executed to disconnect the modem pool and the incoming-call terminal.

In accordance with this third embodiment as described above, a modem pool can be selected for every communication attribute as a transfer destination. As a result, it is possible to prevent a state in which reception is impossible, as can be caused by attributes which do not coincide. In addition, since transfer destinations can be registered in advance, it is unnecessary to select transfer destinations one by one.

As many apparently widely different embodiments of the present invention can be made without departing from the spirit and scope thereof, it is to be understood that the invention is not limited to the specific embodiments thereof except as defined in the appended claims.

What is claimed is:

1. An exchange system, to which a plurality of extension terminals are connected, for connecting a network to any of said plurality of extension terminals upon an incoming-call from the network, incoming call information which includes at least first extension terminal information which designates a first extension terminal and attribute information which indicates a communication attribute, said exchange system comprising:

memory means for storing second extension terminal information which designates a second extension terminal in correspondence with the communication attribute; and calling means for calling the second extension terminal designated by the second extension terminal information stored in said memory means if the first extension terminal is busy.

2. The exchange system according to claim 1, further comprising busy reply means for returning a busy signal to a terminal on a calling side, wherein said control means determines whether or not the second extension terminal designated by the second extension terminal information is busy; and if the second extension terminal is busy, then said control means causes the busy reply means to send the busy signal to the terminal on the calling side.

3. An exchange system, to which a plurality of extension terminals are connected, for connecting a network to any of said plurality of extension terminals upon an incoming call from the network, incoming-call information which includes at least first extension terminal information which designates a first extension terminal and first attribute information which indicates a first communication attribute, said exchange system comprising:

memory means for storing forward-destination information which designates a second extension terminal in correspondence with the first extension terminal and second attribute information which indicates a second communication attribute of the second extension terminal; and control means for comparing the second attribute information of the second extension terminal designated by the forward-destination information with the first received attribute information included in the incoming-call information, and for calling the second extension terminal if the second attribute information is coincident with the first attribute information;

wherein, if the second attribute information of the second extension terminal designated by the forward-destination information is not coincident with the first attribute information, then said control means calls the first extension terminal designated by the first extension terminal information.

4. The exchange system according to claim 3, further comprising busy reply means for returning a busy signal to a terminal on a calling side, wherein said control means determines whether or not the second extension terminal, designated by the forward-destination information is busy, and if the second extension terminal is busy, then said control means causes the busy reply means to send the busy signal to the terminal on the calling side.

5. An exchange system, to which a plurality of extension terminals are connected, for connecting a network to any of said plurality of extension terminals upon an incoming-call from the network, incoming-call information which includes first extension terminal information which designates a first extension terminal and first attribute information which indicates a first communication attribute, said exchange system comprising:

memory means for storing forward-destination information which designates a second extension terminal in correspondence with said first extension terminal and second attribute information which indicates a second communication attribute of the second extension terminal; and control means for identifying whether or not the second attribute information of the second extension terminal designated by the forward-destination information is coincident with the first attribute information included in the incoming-call information, and if said second attribute information is coincident with said first attribute information, then for calling the second extension terminal designated by the forward-destination information.

6. The exchange system according to claim 5, wherein if the second attribute information of the second extension terminal designated by the forward-destination information is not coincident with the first attribute information, then said control means calls the first extension terminal designated by the first extension terminal information.

7. The exchange system according to claim 5, wherein said plurality of extension terminals are capable of registering, the first and second attribute information in said memory means.

8. An exchange system, to which a plurality of extension terminals are connected, for connecting a network to any of said plurality of extension terminals upon an incoming-call from the network, incoming-call information which includes at least first extension terminal information which designates a first extension terminal and first attribute information which indicates a first communication attribute, said exchange system comprising:

modem means shared by the plurality of extension terminals;

memory means for storing second attribute information in correspondence with a communication attribute of said modem means; and control means for judging whether or not the first attribute information corresponds to the second attribute information stored in said memory means, and if the first attribute information corresponds to the second attribute information, then for connecting the network to the first extension terminal designated by the first terminal information via said modem means.

9. The exchange system according to claim 8, wherein said control means judges whether or not the second attribute information stored in said memory means is coincident with a third communication attribute of an extension terminal of the plurality of extension terminals, and if the second communication attribute is coincident with the third communication attribute, then said control means connects an incoming call to the extension terminal having the third communication attribute.

10. A call connecting method in an exchange system, to which a plurality of extension terminals are connected, for connecting a network to any of said plurality of extension terminals upon an incoming-call from the network, incoming-call information which includes at least first extension terminal information which designates a first extension terminal and attribute information which indicates a communication attribute, comprising the steps of:

storing second extension terminal information which designates a second extension terminal in a memory in correlation with the communication attributes;

identifying whether or not the first extension terminal designated by the first extension terminal information, is busy, and calling the second extension terminal designated by the second extension terminal information stored in the memory, if the first extension terminal is busy.

11. The call connecting method according to claim 10, further comprising the steps of:

identifying whether or not the second extension terminal, designated by the second extension terminal information read out from the memory, is busy and if the second extension terminal is busy, then sending a busy signal to a terminal on a calling side.

12. A call connecting method in an exchange system to which a plurality of extension terminals are connected, for connecting a network to any of the plurality of extension terminals upon an incoming call from the network, incoming-call information which includes at least first extension terminal information which designates a first extension terminal and first attribute information which indicates a first communication attribute, comprising the steps of:

storing forward-destination information which designates a second extension terminal in correlation with the first extension terminal and second attribute information of the second extension in a memory; identifying whether or not the first attribute information included in the incoming-call information and the second attribute information of the second extension terminal designated by the forward-destination information are coincident, and if there is coincidence of the attribute information, then connecting the network to the second extension terminal designated by the forward-destination information read out from the memory.

13. The call connecting method according to claim 12, wherein if the first attribute, information included in the incoming-call information and the second attribute information of the second extension terminal designated by the forward destination information are not coincident, then the network is connected to the first extension terminal designated by the first extension terminal information.

14. A call connecting method in an exchange system, to which a plurality of extension terminals are connected, for connecting a network to any of the plurality of extension terminals upon an incoming-call from the network, incoming-call information which includes at least first extension terminal information which designates a first extension terminal and first attribute information which indicates a first communication attribute, the exchange system having a modem shared by the plurality of extension terminals, comprising the steps of:

storing second attribute information in correlation with a communication attribute of the modem in a memory;

identifying whether or not the first attribute information corresponds to the second attribute information stored in the memory, and connecting the network to the first extension terminal designated by the first extension terminal information via said modem, if the first attribute information corresponds to the second attribute information.

15. An exchange apparatus for connecting a calling party to an extension terminal upon receiving incoming call information including extension terminal address information and attribute information, said exchange apparatus comprising:

memory means for storing second extension terminal address information for call transfer in correspondence with first extension terminal address information and first attribute information; and calling means for calling an extension terminal corresponding to the second extension terminal address information stored in said memory means, in correspondence with the first extension terminal address information and the first attribute information, when the incoming call information including the first extension terminal address information and the first attribute information is received.

16. An apparatus according to claim 15, wherein said first extension terminal address information designates a first extension terminal, and said second extension terminal address information designates an extension terminal other than the first extension terminal.

17. An apparatus according to claim 15, wherein said calling means includes receiving means for receiving the incoming call information from an ISDN.

18. An apparatus according to claim 15, wherein said calling means includes reading means for reading out the second extension terminal address information from said memory means in correspondence with the first extension terminal address information and the first attribute information which are included in the incoming call information.

19. An apparatus according to claim 15, wherein said calling means calls the extension terminal corresponding to the second extension terminal address information when an extension terminal designated by the first extension terminal address information is unavailable.

20. An apparatus according to claim 15, wherein said calling means calls the extension terminal corresponding to the first attribute information, if a plurality of items of the second extension terminal address information are stored in said memory means in correspondence with the first extension terminal address information included in the incoming call information.

21. A call connecting method in an exchange apparatus for connecting a calling party to an extension terminal upon receiving incoming call information including extension terminal address information and attribute information, the method comprising the steps of:

identifying second extension terminal address information for call transfer upon receiving incoming call information including first extension terminal address information and first attribute information; and calling an extension terminal in correspondence with the second extension terminal address information identified at the identifying step.

22. A method according to claim 21, wherein said first extension terminal address information designates a first extension terminal, and said second extension terminal address information designates a second extension terminal.

23. A method according to claim 21, wherein said identifying step includes receiving the incoming call information from an ISDN.

24. A method according to claim 21, wherein the identifying step includes reading out the second extension terminal address information from a memory in correspondence with the first extension terminal address information and the first attribute information which are included in the incoming call information.

25. A call connecting method according to claim 21, wherein said calling step calls the extension terminal corresponding to the second extension terminal address information when an extension terminal designated by the first extension terminal address information is unavailable.

26. A call connecting method according to claim 21, wherein said identifying step identifies the second extension terminal address information corresponding to the first attribute information, if the second extension terminal address information can not be identified from the first extension terminal address information.

* * * * *

UNITED STATES PATENT AND TRADEMARK OFFICE
CERTIFICATE OF CORRECTION

PATENT NO.  : 5,408,527
DATED       : April 18, 1995
INVENTOR(S) : Yuichiro Tsutsui It is certified that error appears in the above-indentified patent and that said Letters Patent is hereby corrected as shown below:

On the title page, item

[19] Name of Inventor

"Tsutsu" should read --Tsutsui--.

[75] Inventor

"Yuichiro Tsutsu," should read --Yuichiro Tsutsui,--.

COLUMN 5

Line 28, "memory" should --memories--.

COLUMN 14

Line 44, "busy," should read --busy;--; and

Line 68, "ory; identifying" should read --ory;-- and begin new paragraph with --identifying whether--.

UNITED STATES PATENT AND TRADEMARK OFFICE
CERTIFICATE OF CORRECTION

PATENT NO. : 5,408,527
DATED : April 18, 1995
INVENTOR(S) : Yuichiro Tsutsui

It is certified that error appears in the above-indentified patent and that said Letters Patent is hereby corrected as shown below:

COLUMN 15

Line 10, "attribute," should read --attribute--; and
Line 30, "memory;" should read --memory; and--.

Signed and Sealed this

Seventeenth Day of October, 1995

BRUCE LEHMAN

*Attest:*

*Attesting Officer*     Commissioner of Patents and Trademarks